United States Patent
Murakami

(10) Patent No.: US 10,202,485 B2
(45) Date of Patent: Feb. 12, 2019

(54) POLYMERIZABLE COMPOSITION FOR OPTICAL MATERIAL, OPTICAL MATERIAL, AND METHOD OF MANUFACTURING OPTICAL MATERIAL

(71) Applicant: Mitsui Chemicals, Inc., Minato-ku, Tokyo (JP)

(72) Inventor: Masakazu Murakami, Kurume (JP)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 447 days.

(21) Appl. No.: 14/778,177

(22) PCT Filed: Mar. 28, 2014

(86) PCT No.: PCT/JP2014/059286
§ 371 (c)(1),
(2) Date: Sep. 18, 2015

(87) PCT Pub. No.: WO2014/157664
PCT Pub. Date: Oct. 2, 2014

(65) Prior Publication Data
US 2016/0280840 A1    Sep. 29, 2016

(30) Foreign Application Priority Data
Mar. 29, 2013   (JP) ................... 2013-071284

(51) Int. Cl.
| | | |
|---|---|---|
| *C08G 18/38* | (2006.01) | |
| *C08G 18/81* | (2006.01) | |
| *G02B 1/04* | (2006.01) | |
| *B29D 11/00* | (2006.01) | |
| *C08G 18/08* | (2006.01) | |

(52) U.S. Cl.
CPC .... *C08G 18/3876* (2013.01); *B29D 11/00038* (2013.01); *B29D 11/00134* (2013.01); *C08G 18/08* (2013.01); *C08G 18/8133* (2013.01); *G02B 1/04* (2013.01); *G02B 1/041* (2013.01); *C08G 2120/00* (2013.01)

(58) Field of Classification Search
CPC ............ C08G 18/3876; C08G 18/8133; C08G 18/08; G02B 1/04; G02B 1/041; B29D 11/00038; B29D 11/00134
See application file for complete search history.

(56) References Cited

U.S. PATENT DOCUMENTS

| | | |
|---|---|---|
| 4,380,647 A | 4/1983 | Koch et al. |
| 4,505,792 A | 3/1985 | Koch et al. |
| 5,115,032 A | 5/1992 | Takiyama et al. |
| 6,204,311 B1 | 3/2001 | Morijiri et al. |
| 6,300,464 B2 | 10/2001 | Morijiri et al. |
| 6,458,917 B2 | 10/2002 | Morijiri et al. |
| 8,304,507 B2 | 11/2012 | Iwazumi et al. |
| 8,434,866 B2 | 5/2013 | Hayashi et al. |
| 2001/0002413 A1 | 5/2001 | Morijiri et al. |
| 2002/0019511 A1 | 2/2002 | Morijiri et al. |
| 2003/0144383 A1 | 7/2003 | Ott et al. |
| 2010/0075154 A1 | 3/2010 | Hayashi et al. |
| 2010/0311861 A1 | 12/2010 | Clapper et al. |
| 2011/0112269 A1 | 5/2011 | Iwazumi et al. |

FOREIGN PATENT DOCUMENTS

| | | | |
|---|---|---|---|
| CN | 102803320 A | | 11/2012 |
| JP | 62-232424 A | | 10/1987 |
| JP | 62-250035 | * | 10/1987 |
| JP | 62-250035 A | | 10/1987 |
| JP | 62-257935 | * | 11/1987 |
| JP | 62-257937 A | | 11/1987 |
| JP | 1-306424 A | | 12/1989 |
| JP | 5-25240 A | | 2/1993 |
| JP | 11-322930 A | | 11/1999 |
| JP | 2004-502804 A | | 1/2004 |
| WO | WO 2010/001550 A1 | | 1/2010 |
| WO | WO 2010/032365 A1 | | 3/2010 |

OTHER PUBLICATIONS

Office Action issued by the Chinese Patent Office in corresponding Chinese Patent Application No. 201480013331.7 dated Feb. 27, 2017 (10 pages including partial English translation).

Office Action issued by the Japanese Patent Office in corresponding Japanese Patent Application No. 2015-508787 dated Sep. 15, 2015 (2 pages).

International Search Report (PCT/ISA/210) dated Jun. 10, 2014, by the Japanese Patent Office as the International Searching Authority for International Application No. PCT/JP2014/059286.

T. Miura et al., "Synthesis of Stereodefined 3-Alkylideneoxindoles by Palladium-catalyzed Reactions of 2-(Alkynyl)aryl Isocyanates with Thiols and Alcohols", Chemistry Letters, 2009, vol. 38, No. 12, pp. 1174-1175.

* cited by examiner

*Primary Examiner* — Mathieu D Vargot
(74) *Attorney, Agent, or Firm* — Buchanan, Ingersoll & Rooney PC

(57) ABSTRACT

The polymerizable composition for an optical material of the present invention includes: (A) a compound having a carbon-carbon triple bond and at least one group selected from an isocyanate group and an isothiocyanate group in a molecule; and (B) a polythiol compound.

9 Claims, No Drawings

POLYMERIZABLE COMPOSITION FOR OPTICAL MATERIAL, OPTICAL MATERIAL, AND METHOD OF MANUFACTURING OPTICAL MATERIAL

TECHNICAL FIELD

The present invention relates to a polymerizable composition for an optical material, an optical material, and a method of manufacturing an optical material.

BACKGROUND ART

Plastic lenses are light weight, less broken, and dyeable, as compared with inorganic lenses. Therefore, in recent years, the application of the plastic lenses to optical materials for a spectacle lens, a camera lens, or the like has increased rapidly. Particularly, from the viewpoint of reducing the thickness of a lens, a plastic material having a high refractive index is desired, and, from the viewpoint of reducing chromatic aberration, a plastic material having a high Abbe number is desired. Among them, a plastic lens, which is comprised of a polythiourethane resin obtained by reacting a polythiol and a polyiso(thio)cyanate compound, has a high refractive index, and is excellent in impact resistance, dye-affinity, workability, and the like.

Further, in recent years, from the viewpoint of fashionability, lens having a two point frame, in which a frame for holding a spectacle lens is not provided at the periphery of a spectacle lens, has been used. When using the two point frame, in order to perform a drilling processing (two point processing) at both ends of the spectacle lens, the spectacle lens was required to have excellent workability and high strength.

Patent Document 1 discloses a polymerizable composition for an optical material containing a phenylene diisocyanate and a predetermined polythiol compound, and an ultrahigh refractive polythiourethane plastic lens having a refractive index of 1.7 or more, the lens being obtained from the composition.

Further, Patent Document 2 discloses a polymerizable composition for an optical material containing episulfide (thioepoxide). Additionally, it is described that an episulfide-based plastic lens having a refractive index of about 1.7 was obtained using the composition.

Further, Patent Document 3 discloses a composition for plastic lenses containing a compound having at least one radical polymerizable unsaturated double bond in a molecule, a predetermined alicyclic or aromatic polyisocyanate compound, and a predetermined polythiol compound, and discloses a plastic lens obtained from the composition.

RELATED DOCUMENT

Patent Document

[Patent Document 1] Pamphlet of International Publication No. WO2010-032365
[Patent Document 2] Japanese Unexamined Patent Publication No. 11-322930
[Patent Document 3] Japanese Unexamined Patent Publication No. 05-25240

DISCLOSURE OF THE INVENTION

However, the plastic lens obtained from the polymerizable composition for an optical material, described in Patent Document 1, has a high refractive index, but has low Abbe number and relatively large chromatic aberration. That is, there is room for improvement in the Abbe number.

Further, the plastic lens obtained from the polymerizable composition for an optical material containing an episulfide compound, described in Patent Document 2, has a high refractive index, but there were cases in which mechanical strength was lowered.

The plastic lens obtained from the composition described in Patent Document 3 has a low refractive index, and has room for improvement in optical properties. Here, the composition contains three polymerization components, and thus manufacturing processes or manufacturing conditions become complicated, thereby reducing the yield of the plastic lens. Therefore, it is hard to say that this plastic lens has a configuration excellent in manufacturing stability.

The present invention has been made in view of such circumstances, and an object of the present invention is to provide a thiourethane optical material having excellent mechanical strength as well as having excellent optical properties such as refractive index and Abbe number, that is, a thiourethane optical material which is excellent in the balance between these properties.

The present invention may be described as follows.

[1] A polymerizable composition for an optical material, including: (A) a compound having a carbon-carbon triple bond and at least one group selected from an isocyanate group and an isothiocyanate group in a molecule; and (B) a polythiol compound.

[2] The polymerizable composition for an optical material according to [1], in which the compound (A) is represented by following general formula (1);

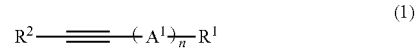

(1)

wherein, in formula (1), $A^1$ represents an alkylene group of 1 to 4 carbon atoms which may be substituted or a phenylene group which may be substituted, n is an integer of 0 or 1, $R^1$ represents an isocyanate group or an isothiocyanate group, and $R^2$ represents a hydrogen atom, an alkyl group of 1 to 4 carbon atoms or a group represented by the following formula;

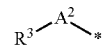

wherein, $A^2$ and $R^3$ have the same meaning as $A^1$ and $R^1$, respectively, and may be the same as or different from these groups, * represents a coupling hand.

[3] The polymerizable composition for an optical material according to [2], in which the compound (A) is represented by following general formula (2);

(2)

wherein, in formula (2), $A^3$ is an alkylene group of 1 to 4 carbon atoms which may be substituted or a phenylene group which may be substituted, $R^4$ represents an isocyanate group or an isothiocyanate group, and n is an integer of 0 or 1)

[4] The polymerizable composition for an optical material according to any one of [1] to [3], in which the polythiol compound (B) is at least one selected from the group consisting of pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithiethane, 1,1,2,2-tetrakis(mercaptomethylthio)ethane, and 3-mercaptomethyl-1,5-dimercapto-2,4-dithiapentane.

[5] The polymerizable composition for an optical material according to any one of [1] to [4], in which a functional group molar ratio represented by the following formula is 0.5 to 3.0.

[(number of moles of isocyanate group included in polymerizable composition+number of moles of isothiocyanate group included in polymerizable composition+(number of triple bonds)×2/number of moles of thiol group included in polymerizable composition)]       Formula:

[6] A method of manufacturing an optical material, including: mixing the compound (A) and the polythiol compound (B) to prepare the polymerizable composition for an optical material according to any one of [1] to [5]; injecting the polymerizable composition into a casting mold; and polymerizing and curing the polymerizable composition in the casting mold.

[7] An optical material, which is obtained by the manufacturing method according to [6].

[8] The optical material according to [7], in which a refractive index of e-line is in a range of 1.60 to 1.80.

[9] A plastic spectacle lens, which is comprised of the optical material according to [7] or [8].

According to the polymerizable composition for an optical material of the present invention, it is possible to obtain an optical material which has a high refractive index and a high Abbe number and which is also excellent in mechanical strength, that is, an optical material which is excellent in the balance between these properties.

DESCRIPTION OF EMBODIMENTS

The polymerizable composition for an optical material of the present invention includes: (A) a compound having a carbon-carbon triple bond and at least one group selected from an isocyanate group and an isothiocyanate group in a molecule; and (B) a polythiol polymer.

The present inventor found that, in such a configuration, particularly, when a compound (A) having a relatively small molecular weight and having an isocyanate group and a carbon-carbon triple bond in a molecule is used, an optical material having a high refractive index is obtained. Further, they found that, when a combination of a compound (A) and a polythiol compound (B) is used, an optical material having a high refractive index and a high Abbe number and having excellent mechanical strength is obtained. The present invention has been completed based on these findings.

Hereinafter, the polymerizable composition for an optical material according to the present invention will be described with reference to embodiments.

First, each component will be described.

[Compound (A)]

A compound (A) used in the present embodiment has a carbon-carbon triple bond and at least one group selected from an isocyanate group and an isothiocyanate group.

The compound (A) may be represented by following general formula (1).

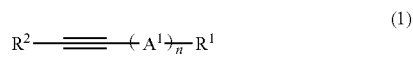

In formula (1), $A^1$ represents an alkylene group of 1 to 4 carbon atoms which may be substituted or a phenylene group which may be substituted.

As the substituent group of the alkylene group of 1 to 4 carbon atoms which may be substituted, a monomethyl group, a dimethyl group, or the like can be exemplified. As the substituent group of the phenylene group which may be substituted, a methyl group or the like can be exemplified.

Preferably, $A^1$ is a methylene group, an ethylene group, a propylene group, a butylene group, an o-phenylene group, a p-phenylene group, or a m-phenylene group.

In formula (1), n is an integer of 0 or 1.

In formula (1), $R^1$ represents an isocyanate group or an isothiocyanate group, and is preferably an isocyanate group.

In formula (1), $R^2$ is a hydrogen atom, an alkyl group of 1 to 4 carbon atoms or a group represented by the following formula.

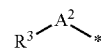

In the formula, $A^2$ and $R^3$ have the same meaning as $A^1$ and $R^1$, respectively, and may be the same as or different from these groups. * represents a coupling hand.

$R^2$ in general formula (1) is preferably a hydrogen atom, a methyl group, or an isocyanatomethylene group.

As the compound (A), preferably, a compound represented by following general formula (2) can be used.

In formula (2), $A^3$ represents an alkylene group of 1 to 4 carbon atoms which may be substituted or a phenylene group which may be substituted.

As the substituent group of the alkylene group of 1 to 4 carbon atoms which may be substituted, a monomethyl group, a dimethyl group, or the like can be exemplified. As the substituent group of the phenylene group which may be substituted, a methyl group or the like can be exemplified.

Preferably, $A^3$ is a methylene group, an ethylene group, or a phenylene group.

$R^4$ represents an isocyanate group or an isothiocyanate group, and is preferably an isocyanate group.

n is an integer of 0 or 1.

Examples of the compound represented by general formula (2) include propargyl isocyanate, ethynyl isocyanate, 3-butyl isocyanate, ethynyl phenylene isocyanate, propargyl isothiocyanate, ethynyl isothiocyanate, 3-butynyl isothiocyanate, and ethynyl phenylene isothiocyanate. In the present embodiment, propargyl isocyanate, propargyl isothiocyanate, ethynyl phenylene isocyanate, and ethynyl phenylene isothiocyanate can be preferably used.

The compound represented by general formula (1) can be obtained by reacting an amine compound or a hydrochloride salt thereof with phosgene or a phosgene equivalent such as triphosgene in a solvent.

[Polythiol Compound (B)]

Examples of the polythiol compound (B) may include: aliphatic polyol compounds, such as methane dithiol, 1,2-ethane dithiol, 1,2,3-propane trithiol, 1,2-cyclohexane dithiol, bis(2-mercaptoethyl)thioether, tetrakis(mercaptomethyl)methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercaptomethyl-1,4-dithiane, 2,5-dimercapto-1,4-dithiane, 2,5-dimercaptomethyl-2,5-dimethyl-1,4-dithiane, and esters of thioglycolic acid and mercaptopropionic acid thereof, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), 2-mercaptoethyl ether bis(2-mercaptoacetate), 2-mercaptoethyl ether bis(3-mercaptopropionate), thiodiglycolic acid bis(2-mercaptoethyl ester), thiodipropionic acid bis(2-mercapto ethyl ester), dithiodiglycolic acid bis(2-mercapto ethyl ester), dithiodipropionic acid bis(2-mercapto ethyl ester), 1,1,3,3-tetrakis(mercaptomethylthio)propane, 1,1,2,2-tetrakis(mercaptomethylthio)ethane, 4,6-bis(mercaptomethylthio)-1,3-dithiane, tris(mercaptomethylthio)methane, tris(mercaptoethylthio)methane; aromatic polythiol compounds, such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4 bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethyleneoxy)benzene, 1,3,5-tris(mercaptoethyleneoxy)benzene, 2,5-toluene dithiol, 3,4-toluene dithiol, 1,5-naphthalene dithiol, and 2,6-naphthalene dithiol; and heterocyclic polythiol compounds, such as 2-methylamino-4,6-dithiol-sym-triazine, 3,4-thiophene dithiol, bismuthiol, 4,6-bis(mercaptomethylthio)-1,3-dithiane, and 2-(2,2-bis(mercaptomethylthio)ethyl)-1,3-dithiethane. At least one of these polythiol compounds can be used as the polythiol compound (B).

Further, oligomers or halogen substitution products such as chlorine substitution products and bromine substitution products of these polythiol compounds can also be used as the polythiol compound (B).

As the polythiol compound (B), at least one selected from the group consisting of pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithiethane, 1,1,2,2-tetrakis(mercaptomethylthio)ethane, and 3-mercaptomethyl-1,5-dimercapto-2,4-dithiapentane can be used.

[Other Components]

The polymerizable composition for an optical material according to the present embodiment can contain a reaction catalyst, a radical polymerization initiator, a polyisocyanate compound, an isocyanate compound having an isothiocyanate group or a polyisothiocyanate compound, and a thiol compound having a hydroxy group, in addition to the above-mentioned compound (A) and polythiol compound (B).

Examples of the reaction catalyst may include: tin compounds, such as dibutyltin dilaurate, dibutyltin dichloride, and, dimethyltin dichloride; and amine compounds such as tertiary amines. These compounds can be used alone or in a combination of two or more thereof. A known urethane-forming catalyst or thiourethane-forming catalyst can also be used as the reaction catalyst.

The amount of the reaction catalyst used is not particularly limited, but is generally in a range of 0 parts by weight to 10 parts by weight based on 100 parts by weight of a polymerizable component.

The radical polymerization initiator is not particularly limited as long as it is responsive to an active energy ray such as heat or ultraviolet. In thermal polymerization, organic peroxides or azo compounds known in the related art can be used. Here, generally, compounds having a 10-hour half-life temperature of 120° C. or lower are preferably used depending on heating conditions. Examples of these compounds can include cumyl peroxyneodecanoate, di-n-propyl peroxydicarbonate, di(2-ethylhexyl)peroxydicarbonate, t-butyl peroxyneodecanoate, 2,4-dichlorobenzoyl peroxide, lauroyl peroxide, acetyl peroxide, t-butyl peroxy-2-ethylhexanoate, benzoyl peroxide, t-butyl peroxyisobutyrate, t-butyl peroxylaurate, t-butyl peroxy-3,5,5-trimethylhexanoate, t-butyl peroxyisopropylcarbonate, t-butyl peroxyacetate, t-butyl peroxybenzoate, methyl ethyl ketone peroxide, dicumyl peroxide, t-butyl cumyl peroxide, and the like. As the azo compounds, azobisisobutyronitrile, 2,2'-azobis(4-methoxy-2,4-dimethylvaleronitrile), and azobis(m-ethylbutylnitrile) can be exemplified. These catalysts may be used alone or in a combination of two or more thereof.

The reaction catalyst and the radical polymerization initiator may be used alone or in a combination thereof.

Examples of the polyisocyanate compound may include: aliphatic polyisocyanate compounds, such as hexamethylene diisocyanate, 2,2,4-trimethylhexane diisocyanate, 2,4,4-trimethylhexamethylene diisocyanate, lysine diisocyanatomethyl ester, lysine triisocyanate, m-xylylene diisocyanate, α,α,α',α'-tetramethylxylylene diisocyanate, bis(isocyanatomethyl)naphthalene, mesitylene triisocyanate, bis(isocyanatomethyl)sulfide, bis(isocyanatoethyl)sulfide, bis(isocyanatomethyl)disulfide, bis(isocyanatoethyl)disulfide, bis(isocyanatomethylthio)methane, bis(isocyanatoethylthio)methane, bis(isocyanatoethylthio)ethane, and bis(isocyanatomethylthio)ethane; alicyclic polyisocyanate compounds, such as isophorone diisocyanate, bis(isocyanatomethyl)cyclohexane, dicyclohexylmethane diisocyanate, cyclohexane diisocyanate, methylcyclohexane diisocyanate, dicyclohexyldimethylmethane isocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, and 4,9-bis(isocyanatomethyl)tricyclodecane; aromatic polyisocyanate compounds, such as diphenyl sulfide-4,4-diisocyanate; and heterocyclic polyisocyanate compounds, such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane.

As the isocyanate compound having an isothiocyanate group, there can be exemplified an isocyanate compound in which some of isocyanate groups of the above-exemplified polyisocyanate compound are changed to isothiocyanate groups.

Examples of the polyisothiocyanate compound may include: aliphatic polyisothiocyanate compounds, such as hexamethylene diisothiocyanate, lysine diisothiocyanatomethyl ester, lysine triisothiocyanate, m-xylylene diisothiocyanate, bis(isothiocyanatomethyl)sulfide, bis(isothiocyanatoethyl)sulfide, and bis(isothiocyanatoethyl)disulfide; alicyclic polyisothiocyanate compounds, such as isophorone diisothiocyanate, bis(isothiocyanatomethyl)cyclohexane, dicyclohexylmethane diisothiocyanate, cyclohexane diisothiocyanate, methylcyclohexane diisothiocyanate, 2,5-bis(isothiocyanatomethyl)bicyclo-[2.2.1]-heptane, 2,6-bis(isothiocyanatomethyl)bicyclo-[2.2.1]-heptane, 3,8-bis(isothiocyanatomethyl)tricyclodecane, 3,9-bis(isothiocyanatomethyl)tricyclodecane, 4,8-bis(isothiocyanatomethyl)tricyclodecane, and 4,9-bis(isothiocyanatomethyl)tricyclodecane; aromatic polyisothiocyanate compounds, such as diphenyldisulfide-4,4-diisothiocyanate; and sulfur-containing heterocyclic polyisothiocyanate compounds, such as 2,5-diisothiocyanatothiophene, 2,5-bis(isothiocyanatomethyl)thiophene, 2,5-diisothiocyanatotetrahydrothiophene, 2,5-bis(isothiocyanatomethyl)tetrahydrothiophene, 3,4-bis(isothiocyanatomethyl)tetrahydrothiophene, 2,5-diisothiocyanato-1,4-dithiane, 2,5-bis(isothiocyanatomethyl)-1,4-dithiane, 4,5-diisothiocyanato-1,3-dithiolane, and 4,5-bis(isothiocyanatomethyl)-1,3-dithiolane.

Further, halogen substitution products such as chlorine substitution products and bromine substitution products, alkyl substitution products, alkoxy substitution products, and nitro substitution products of these polyisocyanate compounds, isocyanate compounds having an isothiocyanate group, and polythioisocyanate compounds; prepolymer modified products, carbodiimide modified products, urea modified products, and biuret modified products thereof with polyhydric alcohols; or dimerization or trimerization reaction products thereof can also be used.

Examples of the thiol compound having a hydroxy group may include 2-mercaptoethanol, 3-mercapto-1,2-propanediol, glycerin bis(mercaptoacetate), 4-mercaptophenol, 2,3-dimercapto-1-propanol, pentaerythritol tris(3-mercaptopropionate), and pentaerythritol tris(thioglycolate).

Meanwhile, the polymerizable composition for an optical material according to the present embodiment, if necessary, in the same manner as that in the known molding method, may further include an ultraviolet absorber such as benzotriazole, an internal release agent such as an acidic phosphoric acid ester, a resin modifier, a light stabilizer, an antioxidant, a chain extender, a crosslinker, an anticolorant, an oil-soluble dye, or a filler.

(Ultraviolet Absorber)

Examples of the ultraviolet absorber include: benzophenone-based ultraviolet absorbers, such as 2,2'-dihydroxy-4,4'-dimethoxybenzophenone, 2-hydroxy-4-acryloyloxybenzophenone, 2-hydroxy-4-acryloyloxy-5-tert-butylbenzophenone, 2-hydroxy-4-acryloyloxy-2',4'-dichlorobenzophenone, and 2-hydroxy-4-methoxybenzophenone; triazine-based ultraviolet absorbers, such as 2-[4-[(2-hydroxy-3-dodecyloxypropyl)oxy]-2-hydroxyphenyl]-4,6-bis(2,4-dimethylphenyl)-1,3,5-triazine, 2-[4-(2-hydroxy-3-tridecyloxypropyl)oxy]-2-hydroxyphenyl]-4,6-bis(2,4-dimethylphenyl)-1,3,5-triazine, 2-[4-[(2-hydroxy-3-(2'-ethyl)hexyl)oxy]-2-hydroxyphenyl]-4,6-bis(2,4-dimethylphenyl)-1,3,5-triazine, 2,4-bis(2-hydroxy-4-butyloxyphenyl)-6-(2,4-bis-butyloxyphenyl)-1,3,5-triazine, and 2-(2-hydroxy-4-[1-octyl-oxycarbonylethoxy]phenyl)-4,6-bis(4-phenylphenyl)-1,3,5-triazine; and benzotriazole-based ultraviolet absorbers, such as 2-(2H-benzotriazol-2-yl)-4-methylphenol, 2-(2H-benzotriazol-2-yl)-4-tert-octylphenol, 2-(2H-benzotriazol-2-yl)-4,6-bis(1-methyl-1-phenylethyl)phenol, 2-(2H-benzotriazol-2-yl)-4,6-di-tert-pentylphenol, 2-(5-chloro-2H-benzotriazol-2-yl)-4-methyl-6-tert-butylphenol, 2-(5-chloro-2H-benzotriazol-2-yl)-2,4-tert-butylphenol, and 2,2'-methylenebis[6-(2H-benzotriazol-2-yl)-4-(1,1,3,3-tetramethylbutyl)phenol], but preferably include: benzotriazole-based ultraviolet absorbers, such as 2-(2H-benzotriazol-2-yl)-4-tert-octylphenol and 2-(5-chloro-2H-benzotriazol-2-yl)-4-methyl-6-tert-butylphenol; and benzophenone-based ultraviolet absorbers, such as 2-hydroxy-4-methoxybenzophenone. These ultraviolet absorbers can be used alone or in a combination of two or more thereof.

(Internal Release Agent)

As the internal release agent, an acidic phosphoric acid ester can be used. Examples of the acidic phosphoric acid ester may include phosphoric acid monoesters and phosphoric acid diesters, and can be used alone or in a mixture of two or more thereof.

For example, ZELEC UN manufactured by STEPAN Corporation, internal release agent for MR manufactured by Mitsui Chemicals, Inc., JP series manufactured by JOHOKU Chemical Co., Ltd., PHOSPHANOL series manufactured by TOHO Chemical Industry Co., Ltd., AP series and DP series manufactured by DAIHACHI Chemical Industry Co., Ltd., and the like can be used.

(Resin Modifier)

Further, in the polymerizable composition of the present embodiment, for the purpose of adjusting the physical properties, such as optical properties, impact resistance, specific gravity of a resin to be obtained and adjusting the viscosity and pot life of the composition, a resin modifier can be added within the range in which the effects of the present invention are not deteriorated.

Examples of the resin modifier include episulfide compounds, alcohol compounds, amine compounds, epoxy compounds, organic acids and anhydrides thereof, and olefin compounds containing (meth)acrylate compounds and the like.

(Light Stabilizer)

As the light stabilizer, a hindered amine compound can be used. Commercially available products of the hindered amine compound may include: Lowilite 76 and Lowilite 92 manufactured by Chemtura Corporation; Tinuvin 144, Tinuvin 292 and Tinuvin 765 manufactured by BASF Corporation; ADK STAB LA-52 and ADK STAB LA-72 manufactured by ADEKA Corporation; and JF-95 manufactured by JOHOKU Chemical Co., Ltd.

(Bluing Agent)

As the bluing agent, there is exemplified a bluing agent having an absorption band in a wavelength range of orange to yellow in a visible light region and having a function of adjusting the color of an optical material comprised of a resin. Specifically, the bluing agent contains a material indicating a blue color to a violet color.

The polymerizable composition for an optical material can be obtained by mixing the above-mentioned components in a predetermined manner.

The mixing order and mixing method of respective components in the composition are not particularly limited as long as respective components can be uniformly mixed, and can be performed by a known method. As a known method, there is exemplified a method of preparing a master batch containing a predetermined amount of additives and dispersing or dissolving this master batch in a solvent.

<Method of Manufacturing Optical Material>

The optical material of the present embodiment can be manufactured by the following processes. Hereinafter, a method of manufacturing an optical material which is a plastic spectacle lens will be described. Here, the method of manufacturing an optical material according to the present embodiment includes a method of preparing a polymerizable composition for an optical material as process (a).

Process (a): a compound (A) and a polythiol compound (B) are mixed to prepare a polymerizable composition for an optical material.

Process (b): the polymerizable composition is injected into a mold for lens casting.

Process (c): the polymerizable composition is polymerized and cured in the mold.

[Process (a)]

In process (a), a compound (A) and a polythiol compound (B) are mixed, and, if necessary, are mixed with a polyisocyanate compound, an isocyanate compound having an isothiocyanate group or a polyisothiocyanate compound, and a thiol compound having a hydroxy group to obtain a mixture. Moreover, a catalyst, and, if necessary, various additives are added to this mixture, and then mixed and dissolved.

From the viewpoint of effects of the present invention, the polymerizable composition containing a compound (A) and a polythiol compound (B) and, if necessary, a polyisocyanate compound, an isocyanate compound having an isothiocyanate group or a polyisothiocyanate compound, and a thiol compound having a hydroxy group can be used such that the formula [(number of moles of isocyanate group included in polymerizable composition+number of moles of isothiocyanate group included in polymerizable composition+(number of triple bonds)×2)/number of moles of thiol group included in polymerizable composition] is 0.5 to 3.0, and preferably 0.5 to 1.5.

If it is within the above range, it is possible to prevent the polymerizable composition from becoming rubbery or to prevent the color of the polymerizable composition from becoming poor during curing, and thus it is possible to obtain a molded product suitable for applications of optical materials.

A polyisocyanate compound, an isocyanate compound having an isothiocyanate group, or a polyisothiocyanate compound, which is added as needed, can be selected from the viewpoint of satisfying optical properties such as a refractive index and physical properties required for the obtained molded product. Specific examples thereof may include 2,5-bis(isocyanatomethyl)-bicyclo-[2.2.1]-heptane and 2,6-bis(isocyanatomethyl)-bicyclo-[2.2.1]-heptane.

The mixing process is generally performed at a temperature of 30° C. or lower. From the viewpoint of pot life of the polymerizable composition, there is a case in which the mixing process is preferred to be performed at even lower temperature. When additives such as a catalyst and a release agent do not exhibit good solubility with respect to a compound (A) and a polythiol compound (B), a polyisocyanate compound, an isocyanate compound having an isothiocyanate group, a polyisothiocyanate compound, and a thiol compound having a hydroxy group which are added as needed, there is a case in which these additives are previously warmed, and then dissolved in a compound (A) and a polythiol compound (B) or a mixture thereof.

[Process (b)]

In process (b), the polymerizable composition for an optical material, obtained in process (a), is injected into a mold for lens casting, held by a gasket or tape.

Depending on the properties required for the plastic spectacle lens which will be obtained, it is preferable that, if necessary, degassing treatment under reduced pressure or filtration treatment under pressure or reduced pressure is previously performed.

[Process (c)]

In process (c), after the composition is injected, a mold for lens casting is heated in heatable equipment such as an oven or in water over a period of several hours to several tens of hours using a predetermined temperature program to cure and mold the composition.

The temperature of polymerization and curing is not limited because conditions change according to the combination ratio of the polymerizable composition, the kind of catalyst or the shape of a mold, but the polymerization and curing of the polymerizable composition is performed over 1 hour to 100 hours at about −50° C. to 200° C. Generally, the polymerization and curing thereof starts at a temperature ranging from 5° C. to 40° C., and then the temperature is gradually raised to a range of 80° C. to 130° C. to cure the polymerizable composition.

After the curing and molding, the plastic spectacle lens according to the present embodiment can be obtained by taking out the resulting cured and molded product from the mold for lens casting. In order to alleviate the distortion due to polymerization, the plastic spectacle lens according to the present embodiment is desired to be annealed by heating the released lens. Annealing temperature is generally 80° C. to 150° C., preferably 100° C. to 130° C., and more preferably 110° C. to 130° C. Annealing time is generally 0.5 hours to 5 hours, and preferably 1 hour to 4 hours.

The plastic spectacle lens according to the present embodiment, if necessary, may be provided on one side or both sides thereof with a coating layer, and then used. Examples of the coating layer include a primer layer, a hard coat layer, an anti-reflective layer, an anti-fogging coating layer, an anti-contamination layer, and a water-repellent layer. These coating layers may be used alone, and may also be used in the form of a multi-layer of a plurality of coating layers. When applying coating layers on both sides of the plastic spectacle lens, identical coating layers may be applied on the respective sides, and different coating layers may also be applied on the respective sides.

In each of these coating layers, an ultraviolet absorber for protecting lenses and eyes from ultraviolet rays, an infrared absorber for protecting eyes from infrared rays, a light stabilizer or antioxidant for improving the weather resistance of a lens, a dye or pigment, particularly, a photochromic dye or photochromic pigment for enhancing the fashionability of a lens, an antistatic agent, and other known additives for improving the performance of a lens may be used in a combination thereof. Various leveling agents may also be used for the purpose of improvement of coatability.

Further, the plastic spectacle lens according to the present embodiment, if necessary, may be subjected to back side polishing, antistatic treatment, dyeing treatment, photochromic treatment, or the like.

The plastic spectacle lens according to the present embodiment, obtained in this way, has a high refractive index, and the e-line refractive index thereof is in a range of 1.60 to 1.80.

Heretofore, an example in which the optical material of the present embodiment is used as a plastic spectacle lens has been described, but, for example, this optical material can be used as: various plastic lenses, such as a spectacle lens for vision correction, a polarizing lens, a photochromic lens, a lens for imaging equipment, a Fresnel lens for liquid crystal projectors, a lenticular lens, and a contact lens; sealing materials for light-emitting diodes (LEDs); optical waveguides; optical adhesives used in bonding optical lenses or optical waveguides; anti-reflective films used for optical lenses; and transparent coatings or transparent substrates used in liquid crystal display members (substrate, light guide plate, film, sheet, and the like).

EXAMPLES

Hereinafter, the present invention will be described in more detail with reference to Preparation Examples and Examples, but the present invention is not limited to these Examples.

The lens obtained by polymerization was evaluated by performance tests. In the performance tests, refractive index and Abbe number, specific gravity, bending strength, and tensile strength were evaluated by the following test method.

Refractive index (ne) and Abbe number (ve) were measured using Pulfrich refractometer KPR-30, manufactured by Shimadzu Corporation, at 20° C.

Specific gravity was measured by an Archimedes method at 20° C.

Bending test: bending strength was measured by AUTOGRAPH AGS-J manufactured by Shimadzu Corporation. The maximum point stress (N/mm$^2$) was measured when a load was applied to the center of a resin test piece having a thickness of 3.0 mm, a length of 75 mm and a width of 25.0 mm at a descending speed of 1.2 mm/min.

Tensile strength test: a resin flat plate prepared to have a lens diameter of 45 mm and a thickness of 2.5 mm was drilled by assuming a two-point frame processing to form holes having a diameter of 1.6 mm at two places of both ends of the resin flat plate. Subsequently, a metal shaft having a diameter of 1.6 mm passed through the holes to attach both ends of a sample to a fixing jig, and then the sample was stretched at a speed of 5, and the test force of the maximum point was measured using AUTOGRAPH AGS-J manufactured by Shimadzu Corporation. The value (kgf/mm) of the obtained maximum point test force divided by the thickness of the resin flat plate was calculated.

Reference Preparation Example 1

11.2 g of propargylamine, 300 ml of an aqueous saturated sodium bicarbonate solution, and 300 ml of dichloromethane were charged into a reactor equipped with a stirrer and a thermometer, and stirred to obtain a solution, and the solution was cooled to 5° C. using an ice water bath. 19.6 g of triphosgene was added to this solution. Stirring was conducted between 5° C. and 10° C. for 1 hour to perform a reaction, and then filtration under reduced pressure was conducted to remove insoluble solids. The remaining mixed solution was statically left, and then liquid separation operation was performed to take out an organic layer (lower layer). The same reaction was performed five times to obtain a reaction solution, and the obtained reaction solution was distilled at normal pressure to remove a solvent, and was then distilled under reduced pressure. Fractions having a boiling point of 50° C. at a pressure of 160 Pa were collected to obtain 31.3 g of propargyl isocyanate (compound No. 1-1), which is a colorless transparent liquid target material, at a purity of 97.7% in a yield of 37.1%.

Reference Preparation Example 2

Polythiol A containing 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithiethane as main components was synthesized in accordance with the method described in Preparation Example 2 of Japanese Unexamined Patent Publication No. 2004-2820.

164.2 g (1 mol) of 1,1,3,3-tetra-methoxypropane, 488.8 g (4 mol) of acetylthiomethyl thiol, and 7.6 g (0.04 mol) of para-toluenesulfonic acid were put into a 2 L bottom cock-equipped flask provided with a stirring blade, a thermometer, a distillation column and a capillary for nitrogen introduction, and heated to 40° C. while maintaining a degree of vacuum of 1 kPa or less with stirring. Heating was continued for about 18 hours until distillation of methanol stopped. After cooling, the vacuum was released, a condenser was fitted instead of the distillation column, and then 400 ml of methanol, 400 ml of chloroform and 200 ml of 36% hydrochloric acid were added thereto and heated to 60° C. to perform alcoholysis, thereby synthesizing polythiol A (target compound) containing 1,1,3,3-tetrakis(mercaptomethylthio) propane as a main component.

Appropriate amounts of water and chloroform were added to perform liquid separation, and a chloroform layer was washed with water several times. Chloroform and low-boiling fractions were removed by desolvation, and then filtration was performed with a 3 μm Teflon (registered trademark) filter to obtain 340.0 g of polythiol A. By LC analysis of polythiol A, two other polythiol compound components were detected (9.8% and 9.8% at a chromatogram area ratio, respectively). When these components were purified and analyzed by LC, they were 4,6-bis(mercaptomethylthio)-1,3-dithiane and 2-(2,2-bis(mercaptomethylthio)ethyl)-1,3-dithiethane, respectively. The analysis results thereof are shown below.

Further, the thiol equivalent of polythiol A was measured by the following method. 0.05 mol/L of an iodine solution was slowly dropped into a mixed solvent solution of 95.1 mg of polythiol A, 30 ml of chloroform and 30 ml of methanol. When the brown color of the dropped iodine no longer disappeared at the time of dropping 9.7 ml of the iodine solution, the amount of SH groups contained in polythiol A was calculated by setting this point as an equivalent point, and, as a result, the amount thereof was 9.64 meq/g.

i) 1,1,3,3-tetrakis(mercaptomethylthio)propane $^1$H-NMR δ (CDCl$_3$): 2.18 (t, 4H), 2.49 (t, 2H), 3.78-3.90 (m, 8H), 4.64 (t, 2H)

$^{13}$C-NMR δ (CDCl$_3$): 26.7, 41.3, 48.7

FT-IR: 538 cm$^{-1}$

MS: m/z=356 (M$^+$)

ii) 4,6-bis(mercaptomethylthio)-1,3-dithiane $^1$H-NMR δ (CDCl$_3$): 2.02 (t, 2H), 2.56 (t, 2H), 3.77-3.91 (m, 8H), 3.97 (S, 2H), 4.66 (t, 2H)

$^{13}$C-NMR δ (CDCl$_3$): 27.1, 28.8, 38.1, 44.6

FT-IR: 2538 cm$^1$

MS: m/z=276 (M$^+$)

iii) 2-(2,2-bis(mercaptomethylthio)ethyl)-1,3-dithiethane $^1$H-NMR δ (CDCl$_3$): 2.03 (t, 2H), 2.13-2.21 (m, 1H), 2.75-2.80 (m, 1H), 3.79-3.84 (m, 1H), 3.90-3.96 (m, 3H), 4.32-4.35 (m, 2H)

$^{13}$C-NMR δ (CDCl$_3$): 27.2, 32.3, 38.9, 46.2

FT-IR: 2538 cm$^{-1}$

MS: m/z=276 (M$^+$)

Example 1

21 parts by weight of the compound represented by the compound No. 1-1 prepared in Reference Preparation Example 1, 79 parts by weight of the polythiol compound A (prepared in Reference Preparation Example 2) containing 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithiethane as main components, 100 ppm of dimethyl tin dichloride, 2500 ppm of "PERBUTYL (R)O" manufactured by NOF Corporation, and 1500 ppm of a mixture of monobutyl phosphate and dibutyl phosphate (mixing ratio of 1:9) were mixed and dissolved at room temperature, filtered using a PTFE-made filter under reduced pressure, and then sufficiently degassed until foaming could not be recognized under a reduced pressure of 150 kPa to 200 kPa. Subsequently, the polymerizable composition was injected into a mold composed of a glass mold and a tape, and then put into a heating oven and gradually heated to 25° C. to 120° C. to perform polymerization for 22 hours. The value of [(number of moles of isocyanate group included in polymerizable composition+number of moles of isothiocyanate group included in polymerizable composition+(number of triple bonds)×2)/number of moles of thiol group included in polymerizable composition] of this polymerizable composition was 1.0.

The molded piece of the obtained resin had good transparency, and had a good appearance without distortion. The evaluation results thereof are shown in Table 1 below.

Examples 2 and 3

Operations were performed in the same manner as in Example 1, except for changing the composition as shown in Table 1. The compositions and evaluation results are shown in Table 1 below.

Comparative Example 1

In a glass beaker, 100 ppm of dimethyl tin dichloride as a catalyst, 1500 ppm of ZELEC-UN (trade name, manufactured by STEPAN Corporation: acidic phosphoric acid ester), 44 parts by weight of m-xylene diisocyanate (compound (a)), and 56 parts by weight of polythiol A containing 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithiethane as main components were charged, and then stirred and mixed at room temperature. The mixed compounds were subjected to degassing under reduced pressure. Subsequently, the polymerizable composition was injected into a mold composed of a glass mold and a tape, and then put into a heating oven and gradually heated to 25° C. to 120° C. to perform polymerization for 20 hours.

The molded piece of the obtained resin had good transparency, and had good appearance without distortion, but the Abbe number thereof was 30. The evaluation results thereof are shown in Table 1 below.

TABLE 1

| | Composition (parts by weight in parenthesis) | | Molar ratio* of functional group | Evaluation items | | |
|---|---|---|---|---|---|---|
| | | | | Optical properties | | |
| | Isocyanate compound | Thiol compound 1 | | Refractive index | Abbe number | Specific gravity d |
| Comp. Ex. 1 | Compound(a) (44) | A (56) | 0.9 | 1.695 | 30 | 1.43 |
| Ex. 1 | No. 1-1 (21) | A (79) | 1.0 | 1.730 | 34 | 1.47 |
| Ex. 2 | No. 1-1 (28) | A (72) | 1.5 | 1.721 | 35 | 1.46 |
| Ex. 3 | No. 1-1 (18) | A (82) | 0.8 | 1.733 | 33 | 1.44 |

No. 1-1: compound of Reference Preparation Example 1
A: polythiol containing 1,1,3,3-tetrakis(mercaptomethylthio)propane, 4,6-bis(mercaptomethylthio)-1,3-dithiane and 2-(2,2-bis(mercaptomethylthio)ethyl)-1,3-dithiethane as main components
Compound(a): m-xylene diisocyanate
*(number of moles of isocyanate group included in polymerizable composition + number of moles of isothiocyanate group included in polymerizable composition + (number of triple bonds) × 2)/number of moles of thiol group included in polymerizable composition From the results of Table 1 above, it was found that each of the molded products of Examples 1 to 3, which was obtained using the compound No. 1-1 having a carbon-carbon triple bond and an isocyanate group in a molecule as an isocyanate compound, was excellent in even any of Abbe number and refractive index, compared to the molded product of Comparative Example 1, which was obtained using m-xylene diisocyanate.

Example 4

23 parts by weight of the compound represented by the compound No. 1-1 prepared in Reference Preparation Example 1, 77 parts by weight of polythiol B containing 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6, 9-trithiaundecane as main components, 100 ppm of dimethyl tin dichloride, 2500 ppm of "PERBUTYL (R)O" manufactured by NOF Corporation, and 1500 ppm of a mixture of monobutyl phosphate and dibutyl phosphate (mixing ratio of 1:9) were mixed and dissolved at room temperature, filtered using a PTFE-made filter under reduced pressure, and then sufficiently degassed until foaming could not be recognized under a reduced pressure of 150 kPa to 200 kPa. Subsequently, the polymerizable composition was injected into a mold composed of a glass mold and a tape, and then put into a heating oven and gradually heated to 25° C. to 120° C. to perform polymerization for 22 hours.

The molded piece of the obtained resin had good transparency, and had a good appearance without distortion. The evaluation results thereof are shown in Table 2 below.

Examples 5 to 7

Operations were performed in the same manner as in Example 4, except for adding pentaerythritol tetrakismercaptopropionate (polythiol C) and changing the composition as shown in Table 2. The compositions and evaluation results are shown in Table 2 below.

Comparative Example 2

In a glass beaker, 100 ppm of dimethyl tin dichloride as a catalyst, 1500 ppm of Zelec-UN (trade name, manufactured by Stepan Corporation: acidic phosphoric acid ester), 51 parts by weight of m-xylene diisocyanate (compound (a)), and 49 parts by weight of polythiol B containing 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6, 9-trithiaundecane as main components were charged, and then stirred and mixed at room temperature. The mixed compounds were subjected to degassing under reduced pressure. Subsequently, the polymerizable composition was injected into a mold composed of a glass mold and a tape, and then put into a heating oven and gradually heated to 25° C. to 120° C. to perform polymerization for 20 hours.

The molded piece of the obtained resin had good transparency, and had a good appearance without distortion, but the Abbe number thereof was 31. The evaluation results thereof are shown in Table 2 below.

From the results of Table 2 above, it was found that each of the molded products of Examples 4 to 7, which was obtained using the compound No. 1-1 having a carbon-carbon triple bond and an isocyanate group in a molecule as an isocyanate compound, is excellent in Abbe number, compared to the molded product of Comparative Example 2, which was obtained using m-xylylene diisocyanate.

Example 8

14 parts by weight of the compound represented by the compound No. 1-1 prepared in Reference Preparation Example 1, 21 parts by weight of a mixture (compound (b)) of 2,5-bis(isocyanatomethyl)-bicyclo-[2.2.1]-heptane and 2,6-bis(isocyanatomethyl)-bicyclo-[2.2.1]-heptane as an isocyanate compound, 65 parts by weight of polythiol B containing 4,8-dimercaptomethyl-1,11-dimercapto-3,6,9-trithiaundecane, 4,7-dimercaptomethyl-1,11-dimercapto-3, 6,9-trithiaundecane, and 5,7-dimercaptomethyl-1,11-dimercapto-3,6,9-trithiaundecane as main components, 100 ppm of dimethyl tin dichloride, 2500 ppm of "PERBUTYL (R)O" manufactured by NOF Corporation, and 1500 ppm of a mixture of monobutyl phosphate and dibutyl phosphate (mixing ratio of 1:9) were mixed and dissolved at room temperature, filtered by a PTFE-made filter under reduced pressure, and then sufficiently degassed until foaming cannot be recognized under a reduced pressure of 150 kPa to 200 kPa. Subsequently, the polymerizable composition was injected into a mold composed of a glass mold and a tape, and then put into a heating oven and gradually heated to 25° C. to 120° C. to perform polymerization for 22 hours.

The molded piece of the obtained resin has good transparency, and has good appearance without distortion. The evaluation results thereof are shown in Table 3 below.

Examples 9 to 14

Operation was performed in the same manner as in Example 8, except for changing the composition as shown in Table 3. The compositions and evaluation results are shown in Table 3 below.

TABLE 2

| | Composition (parts by weight in parenthesis) | | | Molar ratio* of functional group | Evaluation items | | |
|---|---|---|---|---|---|---|---|
| | | | | | Optical properties | | |
| | Isocyanate compound | Thiol compound 1 | Thiol compound 2 | | Refractive index | Abbe number | Specific gravity d |
| Comp. Ex. 2 | Compound(a) (51) | B (49) | — | 1.0 | 1.668 | 31 | 1.37 |
| Ex. 4 | No. 1-1 (23) | B (77) | — | 1.0 | 1.697 | 35 | 1.40 |
| Ex. 5 | No. 1-1 (25) | B (59) | C (16) | 1.2 | 1.665 | 36 | 1.39 |
| Ex. 6 | No. 1-1 (22) | B (62) | C (16) | 1.0 | 1.670 | 37 | 1.36 |
| Ex. 7 | No. 1-1 (19) | B (64) | C (17) | 0.8 | 1.673 | 35 | 1.38 |

No. 1-1: compound of Reference Preparation Example 1
B: polythiol containing 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane as main components
C: pentaerythritol tetrakis mercaptopropionate
Compound(a): m-xylene diisocyanate
*(number of moles of isocyanate group included in polymerizable composition + number of moles of isothiocyanate group included in polymerizable composition + (number of triple bonds) × 2)/number of moles of thiol group included in polymerizable composition

Comparative Example 3

In a glass beaker, 100 ppm of dimethyl tin dichloride as a catalyst, 1500 ppm of Zelec-UN (trade name, manufactured by Stepan Corporation: acidic phosphoric acid ester), 53 parts by weight of a mixture (compound (b)) of 2,5-bis(isocyanatomethyl)-bicyclo-[2.2.1]-heptane and 2,6-bis(isocyanatomethyl)-bicyclo-[2.2.1]-heptane, and 47 parts by weight of polythiol B containing 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane as main components were charged, and then stirred and mixed at room temperature. The mixed compounds were subjected to degassing under reduced pressure. Subsequently, the polymerizable composition was injected into a mold composed of a glass mold and a tape, and then put into a heating oven and gradually heated to 25° C. to 120° C. to perform polymerization for 20 hours. The evaluation results thereof are shown in Table 3 below.

ppm of "PERBUTYL (R)O" manufactured by NOF Corporation, and 1500 ppm of a mixture of monobutyl phosphate and dibutyl phosphate (mixing ratio of 1:9) were mixed and dissolved at room temperature, filtered using a PTFE-made filter under reduced pressure, and then sufficiently degassed until foaming could not be recognized under a reduced pressure of 150 kPa to 200 kPa. Subsequently, the polymerizable composition was injected into a mold composed of a glass mold and a tape, and then put into a heating oven and gradually heated to 25° C. to 120° C. to perform polymerization for 22 hours.

The molded piece of the obtained resin had good transparency, and had a good appearance without distortion. The evaluation results thereof are shown in Table 4 below.

TABLE 3

| | Composition (parts by weight in parenthesis) | | Molar ratio* of functional group | Evaluation items Optical properties | | |
|---|---|---|---|---|---|---|
| | Isocyanate compound | Thiol compound | | Refractive index | Abbe number | Specific gravity d |
| Comp. Ex. 3 | — | Compound(b) (53) | B (47) | 1.0 | 1.629 | 37 | 1.31 |
| Ex. 8 | No. 1-1 (14) | Compound(b) (21) | B (65) | 1.0 | 1.668 | 38 | 1.33 |
| Ex. 9 | No. 1-1 (16) | Compound(b) (16) | B (68) | 1.0 | 1.665 | 37 | 1.36 |
| Ex. 10 | No. 1-1 (11) | Compound(b) (27) | B (62) | 1.0 | 1.657 | 37 | 1.34 |
| Ex. 11 | No. 1-1 (9) | Compound(b) (24) | B (67) | 1.1 | 1.665 | 38 | 1.33 |
| Ex. 12 | No. 1-1 (13) | Compound(b) (20) | B (67) | 0.9 | 1.663 | 37 | 1.34 |
| Ex. 13 | No. 1-1 (13) | Compound(b) (21) | B (66) | 1.0 | 1.662 | 37 | 1.33 |
| Ex. 14 | No. 1-1 (11) | Compound(b) (25) | B (64) | 0.9 | 1.658 | 37 | 1.35 |

No. 1-1: compound of Reference Preparation Example 1
B: polythiol containing 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane as main components
Compound(b): a mixture of 2,5-bis(isocyanatomethyl)-bicyclo-[2.2.1]-heptane and 2,6-bis(isocyanatomethyl)-bicyclo-[2.2.1]-heptane
*(number of moles of isocyanate group included in polymerizable composition + number of moles of isothiocyanate group included in polymerizable composition + (number of triple bonds) × 2)/number of moles of thiol group included in polymerizable composition From the results of Table 3 above, it was found that, comparing each of the molded products of Examples 8 to 14, which were obtained using the compound No. 1-1 having a carbon-carbon triple bond and an isocyanate group in a molecule as an isocyanate compound, is excellent in Abbe number with the molded product of Comparative Example 3, which was obtained using only the compound (b), a molded product having higher refractive index while exhibiting the same Abbe number was obtained by the addition of the compound No. 1-1.

Example 15

24 parts by weight of propargyl isothiocyanate (manufactured by Fluorochem Ltd.) represented by the compound No. 1-2 as an isothiocyanate compound, 76 parts by weight of polythiol A containing 1,1,3,3-tetrakis(mercaptomethylthio)propane, 4,6-bis(mercaptomethylthio)-1,3-dithiane and 2-(2,2-bis(mercaptomethylthio)ethyl)-1,3-dithiethane as main components, 100 ppm of dimethyl tin dichloride, 2500

TABLE 4

| | Composition (parts by weight in parenthesis) | | Molar ratio* of functional group | Evaluation items Optical properties | |
|---|---|---|---|---|---|
| | Isothiocyanate compound | Thiol compound 1 | | Refractive index | Abbe number |
| Ex. 15 | No. 1-2 (24) | A (76) | 1.0 | 1.759 | 28 |

No. 1-2: propargyl isothiocyanate
A: polythiol containing 1,1,3,3-tetrakis(mercaptomethylthio)propane, 4,6-bis(mercaptomethylthio)-1,3-dithiane and 2-(2,2-bis(mercaptomethylthio)ethyl)-1,3-dithiethane as main components
*(number of moles of isocyanate group included in polymerizable composition + number of moles of isothiocyanate group included in polymerizable composition + (number of triple bonds) × 20/number of moles of thiol group included in polymerizable composition

Comparative Example 4

90.9 parts by weight of bis(2,3-epithiopropyl)disulfide (compound (E-1)) and 1 part by weight of an ultraviolet absorber (trade name: Tinuvin PS) were mixed and dissolved at 20° C. to obtain a homogenous solution. Then, 9.1 parts by weight of polythiol B containing 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane as main components was added to this solution, mixed and dissolved, and then filtered using a 3 μm PTFE-made filter. Subsequently, 910 ppm of dicyclohexylmethylamine and 190 ppm of dimethylcyclohexylamine were added to this solution, mixed in and dissolved, and then injected into a mold composed of a glass mold and a tape, and gradually heated from 30° C. to 80° C. over 21 hours to be polymerized. After the completion of the polymerization, the mold was released to obtain a resin molded product. The obtained resin molded product was annealed at 120° C. for 3 hours. Data of drilling tension test are shown in Table 5 below.

TABLE 5

| | Composition (parts by weight in parenthesis) | | Molar ratio* of functional group | Optical properties | | Three-point bending test Maximum point stress (N/mm²) | Drilling tension test Test force/ thickness (kgf/mm) |
|---|---|---|---|---|---|---|---|
| | Monomer | Thiol compound | | Refractive index | Abbe number | | |
| Comp. Ex. 4 | E-1 (90.9) | B (9.1) | — | 1.737 | 32 | 121 | 16.6 |
| Ex. 1 | No. 1-1 (21) | A (79) | 1.0 | 1.730 | 34 | 163 | 25.3 |
| Ex. 9 | No. 1-1 (16) | Compound(b) (16) | B (68) | 1.0 | 1.665 | 37 | 160 | 24.3 |

E-1: bis(2,3-epithiopropyl) disulfide
No. 1-1: compound of Reference Preparation Example 1
A: polythiol containing 1,1,3,3-tetrakis(mercaptomethylthio)propane, 4,6-bis(mercaptomethylthio)-1,3-dithiane and 2-(2,2-bis(mercaptomethylthio)ethyl)-1,3-dithiethane as main components
B: polythiol containing 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane as main components
Compound(b): a mixture of 2,5-bis(isocyanatomethyl)-bicyclo-[2.2.1]-heptane and 2,6-bis(isocyanatomethyl)-bicyclo-[2.2.1]-heptane
*(number of moles of isocyanate group included in polymerizable composition + number of moles of isothiocyanate group included in polymerizable composition + (number of triple bonds) × 2)/number of moles of thiol group included in polymerizable composition From the results of Table 5 above, it was found that each of the molded products of Examples 1 and 9, which was obtained using the compound No. 1-1 having a carbon-carbon triple bond and an isocyanate group in a molecule as an isocyanate compound, is excellent in physical properties, such as refractive index, Abbe number, bending strength and tensile strength, compared to the molded product of Comparative Example 4, which was obtained using bis(2,3-epithiopropyl)disulfide, and thus it was possible to obtain a thiourethane optical material having a good balance between these physical properties.

This application claims the benefit of Japanese Patent Application No. 2013-071284, filed Mar. 29, 2013, which is hereby incorporated by reference in its entirety into this application.

The invention claimed is:

1. A polymerizable composition for an optical material, comprising:
   (A) a compound represented by following general formula (1); and
   (B) a polythiol compound,

(1)

wherein, in formula (1), $A^1$ represents an alkylene group of 1 to 4 carbon atoms which may be substituted or a phenylene group which may be substituted, wherein a carbon-carbon triple bond directly bonds to the alkylene group or the phenylene group, n is an integer of 0 or 1, $R^1$ represents an isocyanate group or an isothiocyanate group, and $R^2$ represents a hydrogen atom, an alkyl group of 1 to 4 carbon atoms or a group represented by the following formula;

wherein, $A^2$ and $R^3$ have the same meaning as $A^1$ and $R^1$, respectively, and may be the same as or different from these groups, and * represents a coupling hand.

2. The polymerizable composition for an optical material according to claim 1,
   wherein the compound (A) is represented by following general formula (2);

(2)

wherein, in formula (2), $A^3$ is an alkylene group of 1 to 4 carbon atoms which may be substituted or a phenylene group which may be substituted, wherein a carbon-carbon triple bond directly bonds to the alkylene group or the phenylene group, $R^4$ represents an isocyanate group or an isothiocyanate group, and n is an integer of 0 or 1.

3. The polymerizable composition for an optical material according to claim 1,
   wherein the polythiol compound (B) is at least one selected from the group consisting of pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithiethane, 1,1,2,2-tetrakis(mercaptomethylthio)ethane, and 3-mercaptomethyl-1,5-dimercapto-2,4-dithiapentane.

4. The polymerizable composition for an optical material according to claim 1, wherein a functional group molar ratio represented by the following formula is 0.5 to 3.0,

[(number of moles of isocyanate group included in polymerizable composition+number of moles of isothiocyanate group included in polymerizable composition+(number of triple bonds)×2)/number of moles of thiol group included in polymerizable composition]. Formula:

5. A method of manufacturing an optical material, comprising:
mixing the compound (A) and the polythiol compound (B) to prepare the polymerizable composition for an optical material according to claim 1;
injecting the polymerizable composition into a casting mold; and
polymerizing and curing the polymerizable composition in the casting mold.

6. An optical material, which is obtained by the manufacturing method according to claim 5.

7. The optical material according to claim 6, wherein a refractive index of e-line is in a range of 1.60 to 1.80.

8. A plastic eyeglass lens, which is comprised of the optical material according to claim 6.

9. The polymerizable composition for an optical material according to claim 1,
wherein the compound (A) is at least one selected from the group consisting of propargyl isocyanate, ethynyl isocyanate, 3-butyl isocyanate, ethynyl phenylene isocyanate, propargyl isothiocyanate, ethynyl isothiocyanate, 3-butynyl isothiocyanate, and ethynyl phenylene isothiocyanate.

* * * * *